(12) United States Patent
Ning

(10) Patent No.: US 9,436,037 B2
(45) Date of Patent: Sep. 6, 2016

(54) DOUBLE-SIDES LIQUID CRYSTAL DEVICES AND BACKLIGHT MODULES

(71) Applicant: Shenzhen China Star Optoelectronics Technology Co., Ltd., Shenzhen, Guangdong (CN)

(72) Inventor: Chao Ning, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 49 days.

(21) Appl. No.: 14/373,479

(22) PCT Filed: Jun. 24, 2014

(86) PCT No.: PCT/CN2014/080623
§ 371 (c)(1),
(2) Date: Jul. 21, 2014

(87) PCT Pub. No.: WO2015/192385
PCT Pub. Date: Dec. 23, 2015

(65) Prior Publication Data
US 2015/0370131 A1  Dec. 24, 2015

(30) Foreign Application Priority Data

Jun. 20, 2014 (CN) .......................... 2014 1 0280269

(51) Int. Cl.
*G02F 1/1335* (2006.01)
*G02F 1/1333* (2006.01)

(52) U.S. Cl.
CPC ... *G02F 1/133608* (2013.01); *G02F 1/133603* (2013.01); *G02F 2001/133317* (2013.01); *G02F 2001/133342* (2013.01)

(58) Field of Classification Search
CPC ............ G02F 2001/133342; G02F 1/133602; G02F 1/133608
USPC ....................................... 349/58, 61
See application file for complete search history.

(56) References Cited

U.S. PATENT DOCUMENTS

| 2004/0264211 A1* | 12/2004 | Han | G02B 6/0088 362/561 |
| 2005/0117368 A1* | 6/2005 | Kim | G02B 6/0055 362/609 |
| 2008/0101087 A1* | 5/2008 | Hwang | G02B 6/0063 362/619 |
| 2009/0040422 A1* | 2/2009 | Misono | G02B 6/005 349/62 |
| 2010/0171904 A1* | 7/2010 | Hung | G02F 1/133603 349/67 |

(Continued)

*Primary Examiner* — Sang V Nguyen
(74) *Attorney, Agent, or Firm* — Andrew C. Cheng

(57) ABSTRACT

A double-sided LCD includes a first liquid crystal panel, a second liquid crystal panel arranged opposite to the first liquid crystal panel, and a backlight module arranged therebetween. The backlight module includes: a middle frame being arranged and assembled between the first liquid crystal panel and the second liquid crystal panel; and a light emitting assembly comprises a first lamp board facing toward the first liquid crystal panel, a second lamp board facing toward the second liquid crystal panel, and at least two middle plate being arranged between the first lamp board1 and the second lamp board, a gap is formed between two adjacent middle plates, and the first lamp board and the second lamp board respectively comprises a plurality of light sources. In addition, a backlight module for double-sided LCDs is also disclosed.

8 Claims, 4 Drawing Sheets

(56) References Cited

U.S. PATENT DOCUMENTS

| | | | | |
|---|---|---|---|---|
| 2011/0128722 A1* | 6/2011 | Pan | .................. | G02F 1/133615 362/97.1 |
| 2011/0141746 A1* | 6/2011 | Ing | .................... | G02F 1/133608 362/311.04 |
| 2011/0280003 A1* | 11/2011 | Hsu | .................. | G02F 1/133603 362/97.1 |
| 2012/0092585 A1* | 4/2012 | Byeon | ............... | G02F 1/133308 349/58 |
| 2012/0169967 A1* | 7/2012 | Han | ...................... | G02F 1/1333 349/62 |
| 2013/0258246 A1* | 10/2013 | Kim | .................. | G02F 1/133308 349/62 |
| 2013/0314884 A1* | 11/2013 | Chen | ...................... | H05K 13/00 361/752 |

* cited by examiner

DOUBLE-SIDES LIQUID CRYSTAL DEVICES AND BACKLIGHT MODULES

BACKGROUND OF THE INVENTION

1. Field of the Invention

The present disclosure relates to liquid crystal display technology and more particularly to a double-sided liquid crystal display (LCD) and the backlight module thereof.

2. Discussion of the Related Art

Currently, LCDs may include direct-lit or edge-type backlight modules. However, the backlight modules are designed in the way that only single side is capable of emitting lights. That is, only one liquid crystal module may be cooperatively operated with the backlight module to display one image.

With the social development, it is needed for occasions, such as government offices, hospitals, or supermarkets, where operators may see the display images on the panel at the same time. Thus, a display device capable of displaying double sides is needed. In another example, for the occasions, such as coffee shops or offices, two people may sit just opposite to each other where one display panel is respectively disposed in front of each of them. Under the circumstance, the two display devices may be integrated to one double-sided display device to share the same backlight module. The two panels may be controlled by circuits so as to display the same or different images. In this way, cost, power consumption, and the occupied space may be greatly reduced.

However, conventional double-sided display devices only integrate two liquid crystal devices mechanically. That is, integrating two single-side display devices to be one, which has not reduced the overall cost.

SUMMARY

In one aspect, a double-sided LCD includes: a first liquid crystal panel, a second liquid crystal panel arranged opposite to the first liquid crystal panel, and a backlight module arranged therebetween, the backlight module includes: a middle frame being arranged and assembled between the first liquid crystal panel and the second liquid crystal panel; a light emitting assembly includes a first lamp board facing toward the first liquid crystal panel, a second lamp board facing toward the second liquid crystal panel, and at least two middle plate being arranged between the first lamp board and the second lamp board, a gap is formed between two adjacent middle plates, and the first lamp board and the second lamp board respectively includes a plurality of light sources; and at least one fixing bar being passed through the gaps, and being fixed with a first sidewall and a second sidewall of the middle frame such that the light emitting assembly is fixed within the middle frame.

Wherein the first sidewall of the middle frame includes a first through hole corresponding to each of the gaps, the second sidewall of the middle frame includes a second through hole corresponding to each of the gaps, the first sidewall and the second sidewall are arranged to be opposite to each other, the fixing bar passes through the first through hole, the gaps, the second through hole in turn so as to fix the light emitting assembly within the receiving space of the middle frame.

Wherein the first sidewall and the second sidewall of the middle frame respectively includes protrusions, the first sidewall and the second sidewall are arranged to be opposite to each other, the fixing bar passes through the corresponding gaps, and the fixing bar is fixed on the protrusions such that the light emitting assembly is fixed within the middle frame.

Wherein two ends of the fixing bar are fixed with the first sidewall and the second sidewall of the middle frame via adhesive or screws such that the light emitting assembly is fixed within the middle frame.

In another aspect, a double-sided LCD includes: a first liquid crystal panel, a second liquid crystal panel arranged opposite to the first liquid crystal panel, and a backlight module arranged therebetween, the backlight module includes: a middle frame being arranged and assembled between the first liquid crystal panel and the second liquid crystal panel; and a light emitting assembly includes a first lamp board facing toward the first liquid crystal panel, a second lamp board facing toward the second liquid crystal panel, and at least two middle plate being arranged between the first lamp board and the second lamp board, a gap is formed between two adjacent middle plates, and the first lamp board and the second lamp board respectively includes a plurality of light sources.

Wherein the light emitting assembly includes at least two middle plates being arranged between a first lamp board and a second lamp board, and gaps are formed between the middle plates; and the backlight module further includes one fixing bar being passed through the gaps and being fixed with a first sidewall and a second sidewall of the middle frame such that the light emitting assembly is fixed within the middle frame.

Wherein a first sidewall of the middle frame includes a first through hole corresponding to each of the gaps, a second sidewall of the middle frame includes a second through hole corresponding to each of the gaps, the first sidewall and the second sidewall are arranged to be opposite to each other, the fixing bar passes through the first through hole, the gap, the second through hole in turn so as to fix the light emitting assembly within the receiving space of the middle frame.

Wherein the first sidewall and the second sidewall of the middle frame respectively includes protrusions, the first sidewall and the second sidewall are arranged to be opposite to each other, the fixing bar passes through the corresponding gaps, and the fixing bar is fixed on the protrusions such that the light emitting assembly is fixed within the middle frame.

Wherein two ends of the fixing bar are fixed with the first sidewall and the second sidewall of the middle frame via adhesive or screws such that the light emitting assembly is fixed within the middle frame.

In another aspect, a backlight module for double-sided LCDs includes: a first liquid crystal panel, a second liquid crystal panel arranged opposite to the first liquid crystal panel, and a backlight module arranged therebetween, the backlight module includes:

a middle frame comprising a first sidewall and a second sidewall opposite to the first sidewall; and a light emitting assembly being arranged with the middle frame and being fixed respectively with the first sidewall and the second sidewall, the light emitting assembly includes a first lamp board and a second lamp board, a surface of the first lamp board facing away from the second lamp board includes a plurality of light sources, and the surface of the second lamp board facing away from the first lamp board includes a plurality of light sources.

Wherein the light emitting assembly includes at least two middle plates being arranged between a first lamp board and a second lamp board, and gaps are formed between the middle plates; and the backlight module further includes one fixing bar being passed through the gaps and being fixed with the first sidewall and the second sidewall of the middle frame such that the light emitting assembly is fixed within the middle frame.

Wherein the first sidewall of the middle frame includes a first through hole corresponding to each of the gaps, the second sidewall of the middle frame includes a second through hole corresponding to each of the gaps, the first sidewall and the second sidewall are arranged to be opposite to each other, the fixing bar passes through the first through hole, the gap, the second through hole in turn so as to fix the light emitting assembly within the receiving space of the middle frame.

Wherein the first sidewall and the second sidewall of the middle frame respectively includes protrusions, the first sidewall and the second sidewall are arranged to be opposite to each other, the fixing bar passes through the corresponding gaps, and the fixing bar is fixed on the protrusions such that the light emitting assembly is fixed within the middle frame.

Wherein two ends of the fixing bar are fixed with the first sidewall and the second sidewall of the middle frame via adhesive or screws such that the light emitting assembly is fixed within the middle frame.

In view of the above, the first lamp board and the second lamp board carrying the light source may be precisely fixed within the middle frame without the back plate. As such, the thickness of the backlight module is decreased, and the cost is also decreased at the same time.

DETAILED DESCRIPTION OF THE EMBODIMENTS

Figure 1:
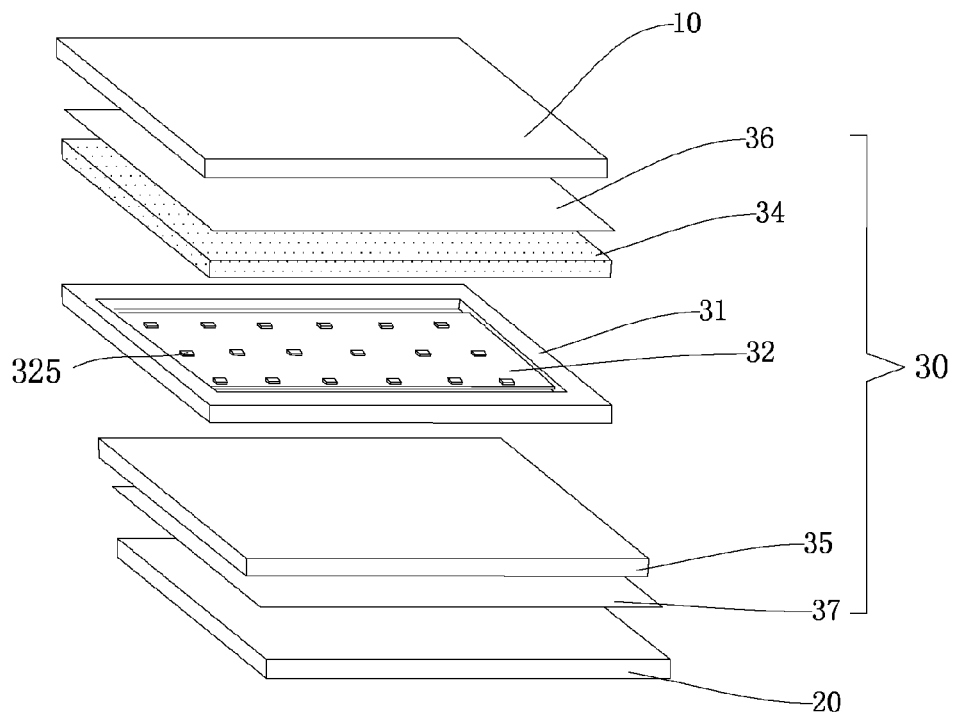
FIG. 1 is an exploded view of the double-sided LCD in accordance with a first embodiment.

Various example embodiments will now be described more fully with reference to the accompanying drawings in which some example embodiments are shown. In the drawings, the thicknesses of layers and regions may be exaggerated for clarity. In the following description, in order to avoid the known structure and/or function unnecessary detailed description of the concept of the invention result in confusion, well-known structures may be omitted and/or functions described in unnecessary detail.

It should be noted that the relational terms herein, such as "first" and "second", are used only for differentiating one entity or operation, from another entity or operation, which, however do not necessarily require or imply that there should be any real relationship or sequence.

Figure 2:
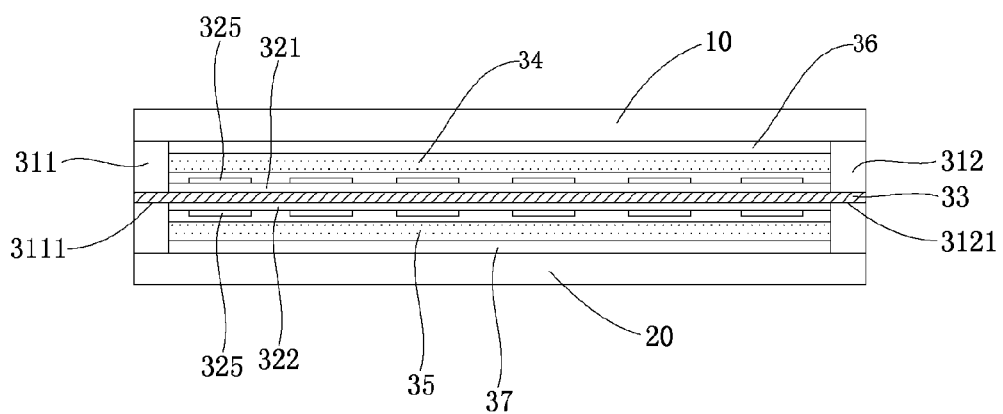
FIG. 2 is a cross-sectional view of the double-sided LCD in accordance with the first embodiment.
Figure 3:
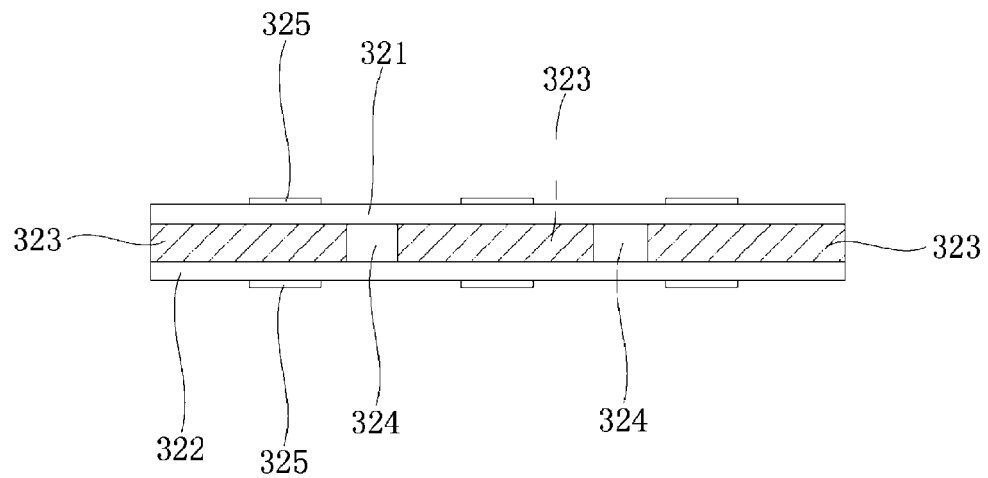
FIG. 3 is a side view of the light emitting assembly in accordance with the first embodiment.
Figure 4:
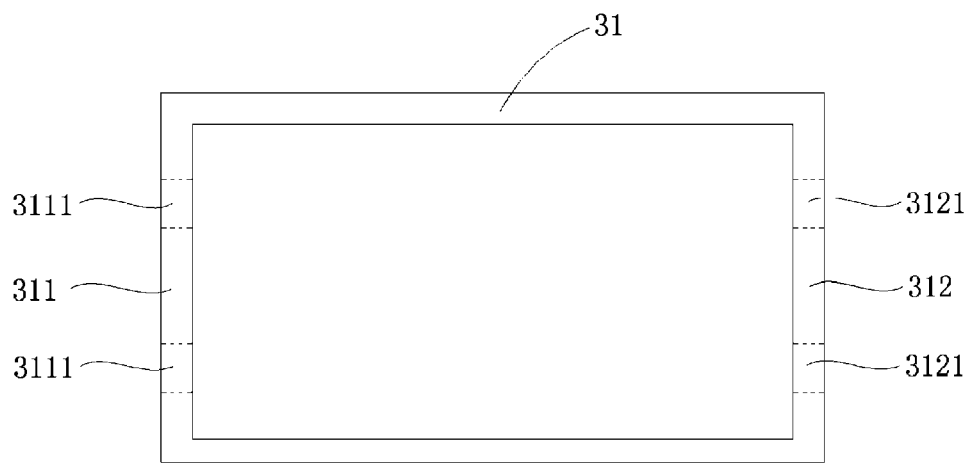
FIG. 4 is a top view of the middle frame in accordance with the first embodiment.

FIG. 1 is an exploded view of the double-sided LCD in accordance with a first embodiment. FIG. 2 is a cross-sectional view of the double-sided LCD in accordance with the first embodiment. FIG. 3 is a side view of the light emitting assembly in accordance with the first embodiment. FIG. 4 is a top view of the middle frame in accordance with the first embodiment.

Referring to FIGS. 1-4, in the first embodiment, the double-sided LCD includes a first liquid crystal panel 10, a second liquid crystal panel 20 arranged opposite to the first liquid crystal panel 10, and a backlight module 30 arranged therebetween.

The backlight module 30 includes a middle frame 31, a light emitting assembly 32, a fixing bar 33, a first diffusion plate 34, a second diffusion plate 35, a first optical film 36, a second optical film 37.

The middle frame 31 includes four sidewalls surrounding to form a receiving space for receiving the backlight module 30 and other optical components. The middle frame 31 is arranged between the first liquid crystal panel 10 and the second liquid crystal panel 20 and is assembled with the first liquid crystal panel 10 and the second liquid crystal panel 20. A first sidewall 311 and a second sidewall 312 of the middle frame 31 are arranged opposite to each other in a horizontal direction.

The light emitting assembly 32 is received in the receiving space and is assembled respectively with the first sidewall 311 and the second sidewall 312. As such, the light emitting assembly 32 is fixed within the middle frame 31. The light emitting assembly 32 includes a first lamp board 321, i.e., a printed circuit board (PCB), facing toward the first liquid crystal panel 10 and a second lamp board 322, i.e., a printed circuit board (PCB), facing toward the second liquid crystal panel 20. A surface of the first lamp board 321, which faces away from the second lamp board 322, includes a plurality of light sources 325, such as LEDs, arranged in a matrix form. The surface of the second lamp board 322, which faces away from the first lamp board 321, includes a plurality of light sources 325 arranged in a matrix form.

The first diffusion plate 34 is horizontally arranged between the first lamp board 321 and the first liquid crystal panel 10. The first optical film 36 is horizontally arranged between the first diffusion plate 34 and the first liquid crystal panel 10. The second diffusion plate 35 is horizontally arranged between the second lamp board 322 and the second liquid crystal panel 20. The second optical film 37 is horizontally arranged between the second diffusion plate 35 and the second liquid crystal panel 20.

In addition, the light emitting assembly 32 also includes at least two middle plates 323 for fixing the light emitting assembly 32 within the middle frame 31. In the embodiment, the light emitting assembly 32 includes, but not limited to, three middle plates 323. In other examples, the light emitting assembly 32 may include two, four, or more middle plates 323. Each middle plate 323 is arranged between the first lamp board 321 and the second lamp board 322. A gap 324 is formed between two adjacent middle plates 323. The first lamp board 321, the middle plate 323, and the second lamp board 322 are assembled together via bonding or other fixing methods.

The number of the fixing bar 33 is the same with the number of the gap 324. In the embodiment, the backlight module 30 includes two fixing bars 33. Each fixing bar 33 passes through the corresponding gap 324. Each of the fixing bar 33 is fixed with the first sidewall 311 and the second sidewall 312 of the middle frame 31 such that the light emitting assembly 32 is fixed within the middle frame 31.

In the embodiment, the first sidewall 311 of the middle frame 31 includes a first through hole 3111 corresponding to each of the gaps 324. Also, the second sidewall 312 of the middle frame 31 includes a second through hole 3121 corresponding to each of the gaps 324. That is, the number of the first through hole 3111 and the number of the second through hole 3121 equal to two. In this way, each of the fixing bar 33 passes the first through hole 3111, the gap 324, the second through hole 3121 in turn so as to fix the light emitting assembly 32 within the receiving space of the middle frame 31.

The first lamp board and the second lamp board carrying the light source 325 may be precisely fixed within the middle frame 31 without the back plate. As such, the thickness of the backlight module 30 is decreased, and the cost is also decreased at the same time.

Figure 5:
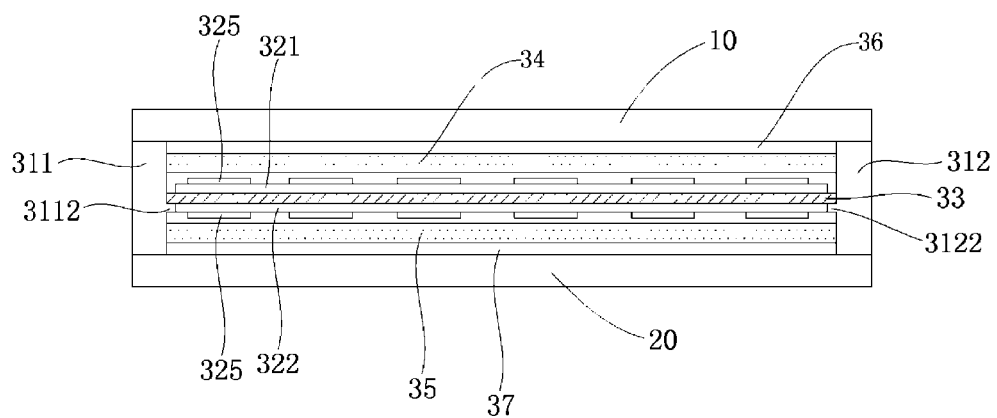
FIG. 5 is a cross-sectional view of the double-sided LCD in accordance with the second embodiment.
Figure 6:
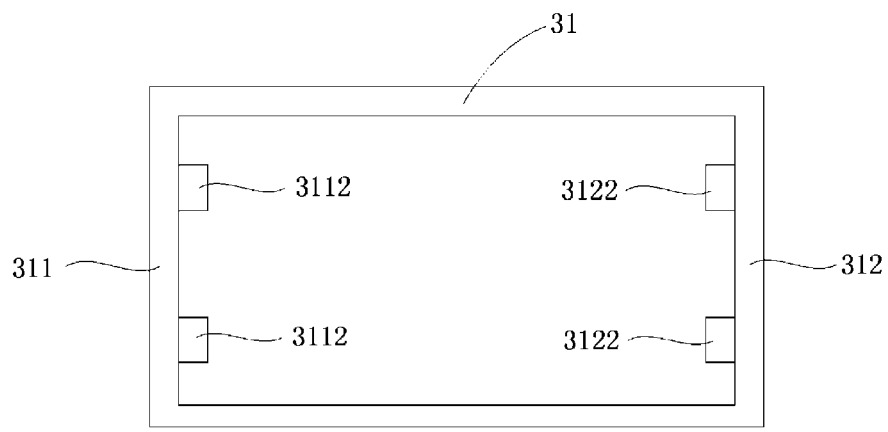
FIG. 6 is a top view of the middle frame in accordance with the second embodiment.

FIG. 5 is a cross-sectional view of the double-sided LCD in accordance with the second embodiment. FIG. 6 is a top view of the middle frame in accordance with the second embodiment.

Only differences between the first embodiment and the second embodiment will be described hereinafter. Referring to FIGS. 5 and 6, the first sidewall 311 of the middle frame 31 includes first protrusions 3112 corresponding to each gaps 324. The second sidewall 312 of the middle frame 31 includes second protrusions 3122 corresponding to each gaps 324. That is, the number of the first protrusions 3112 and the number of the second protrusions 3122 equal to two. Each of the fixing bar 33 passes through the corresponding gap 324. In addition, two ends of each of the fixing bar 33 are fixed on the corresponding first protrusions 3112 and the second protrusions 3122 such that the light emitting assembly 32 is fixed within the middle frame 31.

In the embodiment, the two ends of the fixing bar 33 may be fixed with the corresponding first protrusions 3112 and the second protrusions 3122 by, but not limited to, adhesive methods. In other examples, the fixing bar 33 may be fixed with the first protrusions 3112 and the second protrusions 3122 via screws, or the like.

Figure 7:
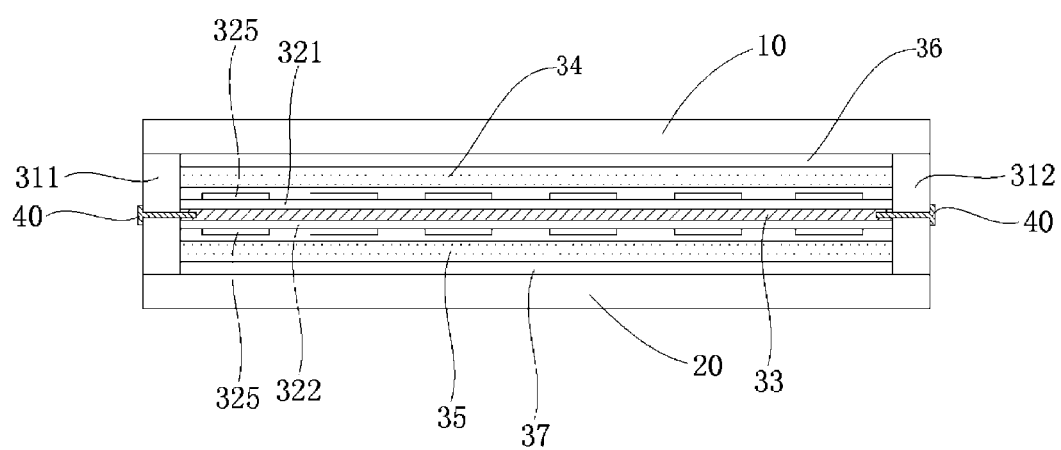
FIG. 7 is a cross-sectional view of the double-sided LCD in accordance with the third embodiment.

FIG. 7 is a cross-sectional view of the double-sided LCD in accordance with the third embodiment. Only differences between the third embodiment and the above-mentioned embodiments will be described hereinafter.

Referring to FIG. 7, each of the fixing bar 33 passes through the corresponding gaps 324. Two ends of the fixing bar 33 are fixed with the first sidewall 311 and the second sidewall 312 of the middle frame 31 via screws 40 such that the light emitting assembly 32 is fixed within the middle frame 31. In other examples, two ends of the fixing bar 33 may be fixed with the first sidewall 311 and the second sidewall 312 of the middle frame 31 via adhesive methods, or the like.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A double-sided LCD, comprising:
    a first liquid crystal panel, a second liquid crystal panel arranged opposite to the first liquid crystal panel, and a backlight module arranged therebetween, the backlight module comprises: a middle frame being arranged and assembled between the first liquid crystal panel and the second liquid crystal panel;
    a light emitting assembly comprises a first lamp board facing toward the first liquid crystal panel, a second lamp board facing toward the second liquid crystal panel, and at least two middle plate being arranged between the first lamp board and the second lamp board, a gap is formed between two adjacent middle plates, and the first lamp board and the second lamp board respectively comprises a plurality of light sources;
    a first diffusion plate between the first lamp board and the first liquid crystal panel, and a second diffusion plate arranged between the second lamp board and the second liquid crystal panel; and
    at least one fixing bar being passed through the gaps, and being fixed with a first sidewall and a second sidewall of the middle frame such that the light emitting assembly is fixed within the middle frame, and wherein a number of the fixing bars is the same with the number of the gaps.

2. The double-sided LCD as claimed in claim 1, wherein the first sidewall of the middle frame comprises a first through hole corresponding to each of the gaps, the second sidewall of the middle frame comprises a second through hole corresponding to each of the gaps, the first sidewall and the second sidewall are arranged to be opposite to each other, the fixing bar passes through the first through hole, the gaps, the second through hole in turn so as to fix the light emitting assembly within the receiving space of the middle frame.

3. The double-sided LCD as claimed in claim 1, wherein the first sidewall and the second sidewall of the middle frame respectively comprises protrusions, the first sidewall and the second sidewall are arranged to be opposite to each other, the fixing bar passes through the corresponding gaps, and the fixing bar is fixed on the protrusions such that the light emitting assembly is fixed within the middle frame.

4. The double-sided LCD as claimed in claim 1, wherein two ends of the fixing bar are fixed with the first sidewall and the second sidewall of the middle frame via adhesive or screws such that the light emitting assembly is fixed within the middle frame.

5. A backlight module for double-sided LCDs, comprising:
    a first liquid crystal panel, a second liquid crystal panel arranged opposite to the first liquid crystal panel, and a backlight module arranged therebetween, the backlight module comprises: a middle frame comprising a first sidewall and a second sidewall opposite to the first sidewall;
    a light emitting assembly being arranged with the middle frame and being fixed respectively with the first sidewall and the second sidewall, the light emitting assembly comprises a first lamp board and a second lamp board, a surface of the first lamp board facing away from the second lamp board comprises a plurality of light sources, and the surface of the second lamp board facing away from the first lamp board comprises a plurality of light sources; and
    a first diffusion plate between the first lamp board and the first liquid crystal panel, and a second diffusion plate arranged between the second lamp board and the second liquid crystal panel;
    wherein the light emitting assembly comprises at least two middle plates being arranged between a first lamp board and a second lamp board, and gaps are formed between the middle plates; and
    the backlight module further comprises one fixing bar being passed through the gaps and being fixed with the first sidewall and the second sidewall of the middle frame such that the light emitting assembly is fixed within the middle frame, and wherein a number of the fixing bars is the same with the number of the gaps.

6. The backlight module as claimed in claim 5, wherein the first sidewall of the middle frame comprises a first through hole corresponding to each of the gaps, the second sidewall of the middle frame comprises a second through hole corresponding to each of the gaps, the first sidewall and the second sidewall are arranged to be opposite to each other, the fixing bar passes through the first through hole, the gap, the second through hole in turn so as to fix the light emitting assembly within the receiving space of the middle frame.

7. The backlight module as claimed in claim 5, wherein the first sidewall and the second sidewall of the middle frame respectively comprises protrusions, the first sidewall and the second sidewall are arranged to be opposite to each other, the fixing bar passes through the corresponding gaps, and the fixing bar is fixed on the protrusions such that the light emitting assembly is fixed within the middle frame.

8. The backlight module as claimed in claim 5, wherein two ends of the fixing bar are fixed with the first sidewall and the second sidewall of the middle frame via adhesive or screws such that the light emitting assembly is fixed within the middle frame.

* * * * *